Patented Nov. 3, 1925.

1,560,321

UNITED STATES PATENT OFFICE.

GEORGE BAKER RILEY, OF EAST DULWICH, ENGLAND.

REENFORCED GLASS.

No Drawing. Application filed April 30, 1925. Serial No. 27,055.

*To all whom it may concern:*

Be it known that I, GEORGE BAKER RILEY, a subject of the King of Great Britain, and resident of East Dulwich, London, England, have invented a certain new and useful Improvement in Reenforced Glass, of which the following is a specification.

This invention relates to reenforced glass of the kind wherein sheets of glass are cemented to opposite sides of a sheet of celluloid for the purpose of preventing the detachment of glass splinters from the compound sheet in the event of the glass being broken.

According to my invention, the glass sheets are treated with a solution containing isinglass and a dextrin gum, the sheet of celluloid is treated with a solution of colophony and castor oil, and the prepared surfaces of the glass and celluloid are united by heat and pressure. The vehicle whereby the isinglass and dextrin gum are applied to the glass advantageously consists of an aqueous solution of acetic acid and glycerine. This coating of isinglass and dextrin gum after it has become dry on the glass may be treated with a solution of formalin. Moreover shellac may be added to the colophony used for coating the sheet of celluloid.

In making such reenforced glass according to my present invention, I proceed as follows:—

The surfaces of the glass sheets to be united to the celluloid, are first cleaned, preferably with rouge powder and then with chromic oxide suspended in water. The surfaces of the glass sheets may then be washed with running water, left to drain and afterwards dried. The suitable cleansed glasses are treated with a solution of water, deodorized isinglass, British gum, acetic acid and glycerine in or about the following proportions:—30 to 60 fluid ounces of water, 70 to 100 grams of deodorized isinglass, e. g. that known as Swinborne's patent isinglass, 15 to 25 grams of British gum, 4 to 8 c. c. of acetic acid and 2 to 4 c. c. of glycerine. The solution is applied at a temperature of about 130° to 180° F., and is left to dry. When dry, the coating is treated with a bath of formalin (preferably of 40% strength), in which it is left for a few minutes. It is then dried and a very elastic adhesive coating with a very hard surface is left. In cases where the process is carried on in a room at a temperature above 60° F., or in cases where small articles are being dealt with, the treatment with formalin may be dispensed with.

In some cases where the glass is uneven in thickness or where bent or curved glass, such as lenses and curved wind screens, is to be dealt with, a solution similar to the above but without glycerine is applied to the glass surfaces and left to dry; then a second coat is applied with the glycerine added. Being a stout coating and very elastic, it compensates for excessive expansion and contraction of the glass sheets. Such coating can also be treated with a formalin bath (preferably of 40% strength) for a few moments.

The British gum above referred to is a dextrin artificial gum, which may advantageously consist of starch, water, and glycerine in or about the proportions of 1 ounce avoirdupois starch, 10 fluid ounces of water and 1/15 fluid ounce of pure glycerine. Such gum may be advantageously prepared as follows: The starch is heated in a dry condition to a temperature of about 260° F., then hot water is added and the mixture stirred continually until the starch is dissolved, whereupon the glycerine is added. It has been found that good results are obtained when using starch made from maize fruits or berries.

The celluloid is treated with a bath of spirit varnish preferably consisting of the following ingredients in or about the proportions stated:

1 gallon of methylated spirit (61 overproof), 1 to 2 lbs. of rosin (colophony), 2 to 4 oz. of shellac (white lac), 1 to 6 oz. of castor oil.

The celluloid sheet is then placed between the glasses prepared as above mentioned with the treated surfaces in contact, before the spirit varnish is dry, and the whole is placed into a press heated to a temperature of about 120° to 230° F., which should be such as to render the mixture sticky and thus to grip on to the prepared surface of the glass, a light pressure up to 1 atmosphere being also necessary according to the size of the glass. By using a low pressure, the strength of the celluloid in the finished product is greater than when high pressures are employed. The effect of using the mixture is that the rosin is kept by the shellac from becoming too soft at high temperatures, and the shellac is kept by the rosin from becoming too hard at low temperatures. The castor oil also limits the degree of hardness possible. In cases where the reenforced glass is not likely to be subjected to great variations of temperature the use of shellac can be dispensed with. If desired oleic acid, rosin oil or other non-drying oil may be used in place of the castor oil.

According to a modification, the celluloid is treated with the spirit varnish and the latter is allowed to dry before being brought into contact with the glasses. The celluloid may be again quickly dipped into the bath, so as to give an extra stout coat of rosin. In this case the glasses, after being prepared as above mentioned, are placed into the spirit varnish before being brought into contact with the prepared surfaces of the celluloid; when the several layers have been placed in position, the whole is placed into a heated press and pressed as above mentioned.

If a coloured glass is required, the necessary colouring matter is added to the spirit varnish, the colouring matter being preferably an aniline dye.

The edge of the reenforced sheets may be sealed in any suitable known manner but the method I prefer is to grind or otherwise form the edge surfaces of the glass sheets inwardly inclined so as to leave a V shaped groove adapted to receive the sealing material which may be British pitch, black prepared beeswax compound, or other sealing material. The inclined edges may with advantage be left rough to facilitate the adhesion of the sealing material.

It will be observed by those conversant with the state of the art that in the manufacture of reenforced glass according to my invention described herein, the present practice of softening the celluloid by a solvent before insertion between the glass plates preparatory to subjecting the whole to pressure, is discarded. The celluloid is provided with a surface of spirit varnish which, in the stage where the whole is subjected to pressure, itself contacts with the prepared surface of the glass, and becomes sticky under the heat at which the pressing together of the glass and celluloid is conducted. This feature of my present invention is one of considerable practical importance.

What I claim and desire to secure by Letters Patent is:—

1. A manufacture of reenforced glass of the kind wherein glass sheets are cemented to opposite sides of a sheet of celluloid, characterized in that the glass sheets are treated with a solution containing isinglass and a dextrin gum, the sheet of celluloid is treated with a solution of colophony and castor oil, and the prepared surfaces of the glass and celluloid are united by heat and pressure.

2. A form of the manufacture claimed in claim 1, wherein the vehicle whereby the isinglass and dextrin gum are applied to the glass consists of an aqueous solution of acetic acid and glycerine, substantially as described.

3. A form of the manufacture claimed in claim 1, wherein the coating of isinglass and dextrin gum after it has become dry on the glass is treated with a solution of formalin, substantially as described.

4. A form of the manufacture claimed in claim 1, wherein shellac is added to the colophony used for coating the sheet of celluloid.

5. A form of the manufacture claimed in claim 1, characterized in that the colophony or the colophony and shellac is or are dissolved in methylated spirit, substantially as described.

6. A form of the manufacture claimed in claim 1 characterized in that the edge surfaces of the glass sheets are inwardly inclined to form a groove to receive sealing material.

In witness whereof I affix my signature.

GEORGE BAKER RILEY.